June 29, 1965 C. W. NOWICKI ETAL 3,191,839
DRUM FORMING MACHINE
Filed Aug. 1, 1962 6 Sheets-Sheet 6

INVENTORS:
C. W. Nowicki,
G. M. Lockwood.
BY
ATT'Y 3,191,839
DRUM FORMING MACHINE
Casimir W. Nowicki, Toledo, Ohio, and George M. Lockwood, Monroe, Mich., assignors to Consolidated Packaging Corporation, Monroe, Mich., a corporation of Michigan
Filed Aug. 1, 1962, Ser. No. 214,037
17 Claims. (Cl. 227—64)

This invention relates to drum carton end applying mechanism and is particularly directed to a machine for securing the bottom disks on the ends of fiberboard drum cartons by means of a pressed flange and/or fastener strip.

An object of this invention is to produce an efficient, effective, simple, economic, adjustable and automatic machine for fastening the bottoms in cylindrical fiberboard drums or containers such as are used in packaging hot asphalt. These cartons also may be used for other solid and semi-fluid materials, including chemicals, greases, and the like.

Another object of the present invention is to provide a machine with means to form a flange on the peripheral edge of a drum carton having an end disk positioned in the end thereof and to secure the flange and disk together such as by an adhesive and/or a strip fastener which may have fastening or adhesive means thereon and/or includes pronged attaching portions.

Another object of the invention is to provide a machine with means to measure and feed a predetermined length of strip fastener to the end of a drum carton together with means to guide said strip in a circular path adjacent the periphery of the drum end, and means to apply rolling pressure to said strip to secure a disk in the end of the carton.

Another object of the invention is to provide a machine with a rotatable spring loaded spindle to which is secured a mandrel having spring loaded shoes to accommodate drum cartons of varying thickness, and means to rotate said spindle in an elevated position during carton flange forming and fastener applying operations.

Another object of the invention is to provide a common control means for a rotatable mandrel and cooperating presser roller actuator to automatically and sequentially produce a flange on the peripheral edge, feed a fastener strip, secure the fastener strip to the carton end, and release a completed carton.

A further object of this invention is to provide a machine for placing the metal strips around the ends or bottoms of the cartons disclosed in Harry E. Hines U.S. Patent No. 2,996,237 issued August 15, 1961.

Generally speaking, the drum forming machine of the present invention comprises a base or body portion on or in which may be mounted a driving motor or motors, gear boxes, and cam mechanisms for operating the movable parts of the machine, which parts include: a rotating spindle over which a cylindrical drum is placed, a pressing roller which may move transversely of the axis of the spindle into pressing engagement with the flanged edge of the drum as it is formed and fastened to the end disk of the drum, and means for radially expanding and axially moving the spindle both to engage frictionally the cylindrical sides of the drum during the forming operation and to press axially the spindle against the pressing roller. The pressing roller may be driven frictionally or positively as desired, and may also include a guide means for a strip of material which may be fed around a peripheral flange from the sides of the drum as it is pressed over the disk end of the drum by the pressing roller to further fasten the end of the drum.

Also attached to the machine may be an automatic feeding device driven in synchronism with the rotation of the spindle for feeding predetermined lengths of the strips to the ends of the drums. These strips may have adhesive means thereon and may include metal strips with prongs sticking from one face thereof which penetrate the pressed-over flanged end of the drum and into the end disk, to fasten the drum end together. This feeding mechanism may be supplied from a magazine for a continuous strip which is automatically cut off the length for one drum end, and also may form the prongs in a plain metal strip.

Briefly one type of operation of the machine of this invention comprises: placing a cylinidrical drum blank over the mandrel which has an end plate that rests inwardly from the end of the cylindrical drum a distance corresponding to the length of the end flange, and then a bottom disk is placed on this plate within this flange portion. The machine is then started by operating a push button which first starts the mandrel to rotate and then moves a pressing roller transversely over the peripheral bottom edge of the disk to bend over the flange portion against the end disk, while the mandrel and drum are raised against the pressing roller and the plate end of the mandrel expands slightly against the inside of the drum to insure good frictional contact for its rotation. immediately thereafter and preferably before the end of the second rotation of the mandrel and drum, the fastening strip is fed between the pressing roller and the end disk by a feed wheel which cuts off a length of the strip corresponding to the distance around flanged end of the drum. The mandrel continues to rotate at least one additional revolution after the application of the strip to adhere or press the strip into intimate contact with the drum end, after which the cam mechanism causes the radial and axial retraction of the mandrel. Then the pressing roller is retracted during which a limit switch is operated for automatically shutting off the machine including the drive for the rotation of the mandrel, so that the completed drum with end may be removed from the mandrel and a new blank may be placed thereon before the operation cycle is again started.

The above mentioned and other features and objects of the invention and the manner of attaining them will become more apparent and the invention itself will be understood best by reference to the following description of an embodiment of the invention taken in conjunction with the accompanying drawings, wherein.

(I) *The power and driving mechanisms*

Referring to FIGS. 1, 2, 3 and 4 there are shown different views of the body 100 of one embodiment of the machine of this invention, which body or framework may house a single driving motor 101 in its lower or base portion 102. The lower portion 102 herein is provided with an upper sloping face 103, the lower end of which journals perpendicularly thereto the spindle for the mandrel 200 upon which the fiberboard cylindrical drum blank 110 is placed with its fiberboard disk end 111 resting on the top or upper end of the mandrel inside the flanged end 112 of the blank 110. The other and upper end of the sloping face 103 of the base portion 102 mounts the upper portion or housing 104 of the body 100, upon the upper end of which is supported the pressing roller 300 with the strip feeder 400 mounted to one side thereof.

The driving mechanisms for these parts of the machine are herein shown to be substantially within the housing or body 100 and may all be driven from the motor 101 through a worm reduction gear box 120 which together with the motor may be mounted on a slidably adjustable base 121 for tensioning the belts 122 and 123, respectively, extending from the pulleys 124 and 125 at opposite ends of a shaft 126 extending through the gear box 120. The slidable mounting plate 121 may be adjusted on its base 127 by means of an adjustment screw 128, which base 127 is anchored to or integral with the bottom of the lower or base housing portion 102.

Figures 2, 6, 7, 8:
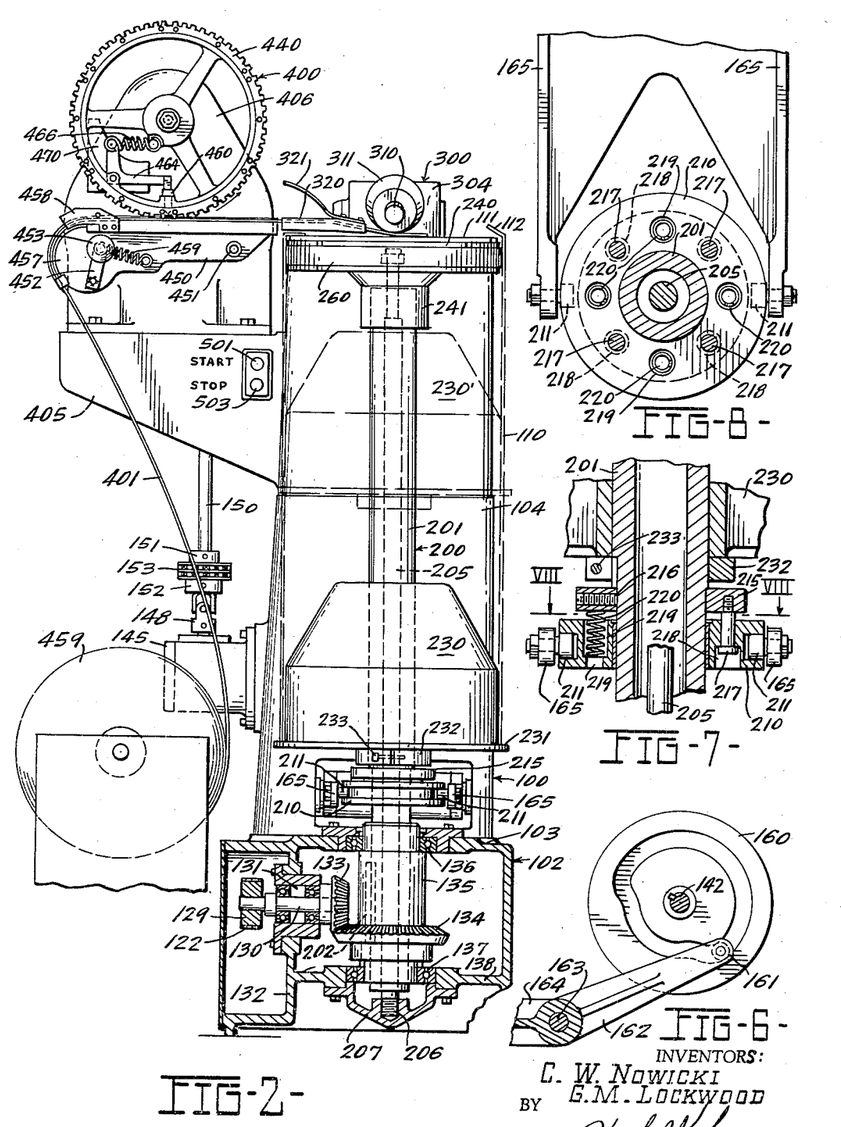
FIG. 2 is a front sectional view of the machine taken along line II—II of FIG. 1 along the axis of the rotating spindle or mandrel for the drum.
FIG. 6 is a detail of the cam for raising the spindle to expand and to press its end plate against the pressing roller.
FIG. 7 is an enlarged vertical section of the resilient connection between the lever arm operated by the cam in FIG. 6 and the spindle.
FIG. 8 is a section taken along line VIII—VIII of FIG. 7 showing the forked end of the lever arm.

The belt 122 is shown herein in FIG. 2 to drive or rotate the mandrel 200 through pulley 129 mounted on one end of a stub shaft 130 mounted in a bearing 131 which may be anchored in a partition 132 of the base portion 102. This shaft 130 has attached to its other end a bevel gear 133 which meshes with a bevel gear 134 keyed to the outer hollow shaft 135 anchored between bearings 136 and 137 in the top and bottom walls 103 and 138 of the lower body portion 102. It is within the center of this outer hollow shaft 135 that the spindle of the mandrel 200 is mounted and rotated, which will be described in the next section II.

Figure 1:
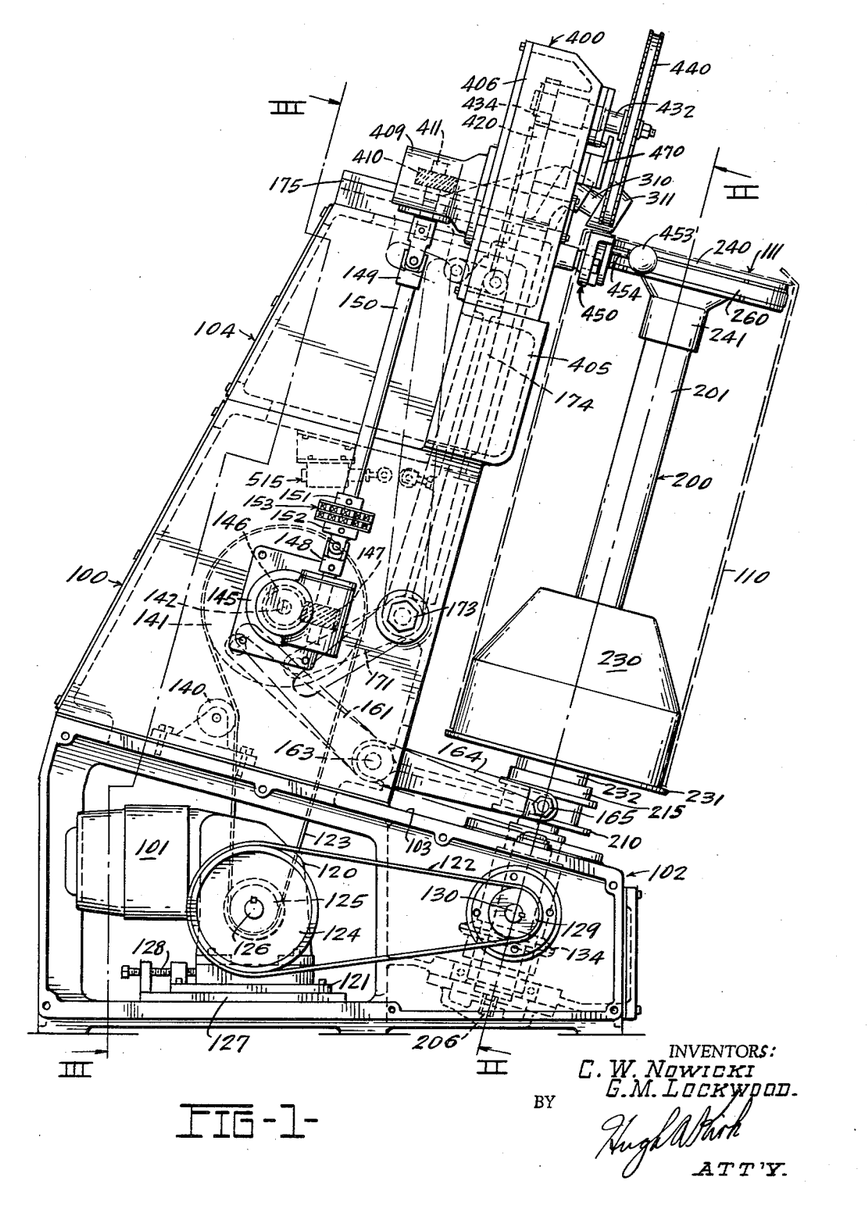
FIG. 1 is a side elevation of one embodiment of this invention with the lower side plate of the body portion removed for showing the motor for driving the machine, and with a drum blank in dotted lines on its spindle or mandrel in end disk fastening position with the pressing roller extending over the upper end of the drum.
Figures 3, 4:
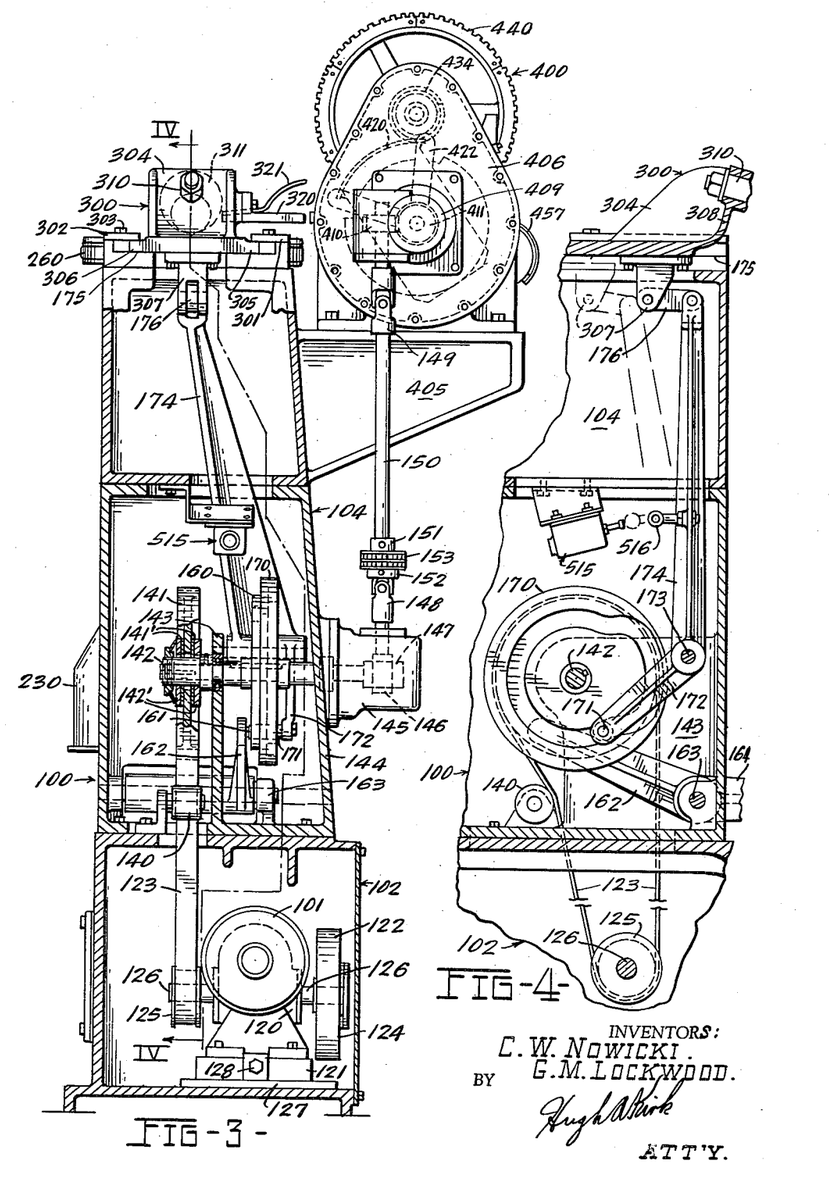
FIG. 3 is a rear sectional view of the machine taken along line III—III of FIG. 1 showing the cam operating mechanism for raising the spindle and for extending the pressing roller, as well as the gearing for operating the strip feeding device.
FIG. 4 is a sectional view taken along line IV—IV of FIG. 3 showing the face of the cam which retracts the pressing roller from its extended position shown in full lines to its retracted position shown in dotted lines.

The belt 123 mounted on the other side of the gear box 120 is shown herein in FIGS. 1 and 3 to pass over an idler pulley 140 and around the pulley 141 mounted on a shaft 142 in the lower part of the upper body portion 104. Between this pulley 141 and its shaft 142 there preferably is provided a friction clutch in order to absorb the shocks of the starting and stopping of the strip feeding device and the reciprocations of the cam operated devices. This friction clutch may comprise a plurality of friction disks 141' between the web of the pulley 141 and plates 142' keyed to the hub fastened to the shaft 142, which plates and disks are adjustably clamped together as shown in FIG. 3. This shaft 142 which is journalled between the partial partition 143 and the side wall 144, projects through this side wall 144 into a gear box 145 from which a shaft is connected for driving the strip feeder 400, such as by means of a pair of worm gears 146 and 147 at right angles to each other in the box 145 and a pair of universal joints 148 and 149 connected by a shaft 150. The connection between the shaft 150 and universal joint 148 may be through a pair of coaxially aligned sprocket wheels 151 and 152 with a sprocket chain 153 around them for easy adjustment of the relative timing between the strip feeder and the mandrel rotations, by removing the sprocket chain, resetting the relative angular positions of the sprocket wheels and remounting the chain around both of them.

Between the partition 143 and wall 144 on the shaft 142 there is shown keyed a pair of face cams 160 and 170 mounted back-to-back, the cam grooves in each being shown in FIGS. 6 and 4, respectively, in which grooves ride respectively cam followers 161 and 171 mounted at the ends of levers 162 and 172 pivoted on stub rocker shafts 163 and 173 journalled in the housing portion 104. The lever arm 164 extending on the opposite side of shaft 163 from the lever arm 162, projects outside of the housing 104 toward the mandrel 200 and is forked at its outer end 165 as shown in FIGS. 7 and 8 for raising and lowering the mandrel 200 as it is rotated and as will be described in the section II below.

Figures 5, 9:
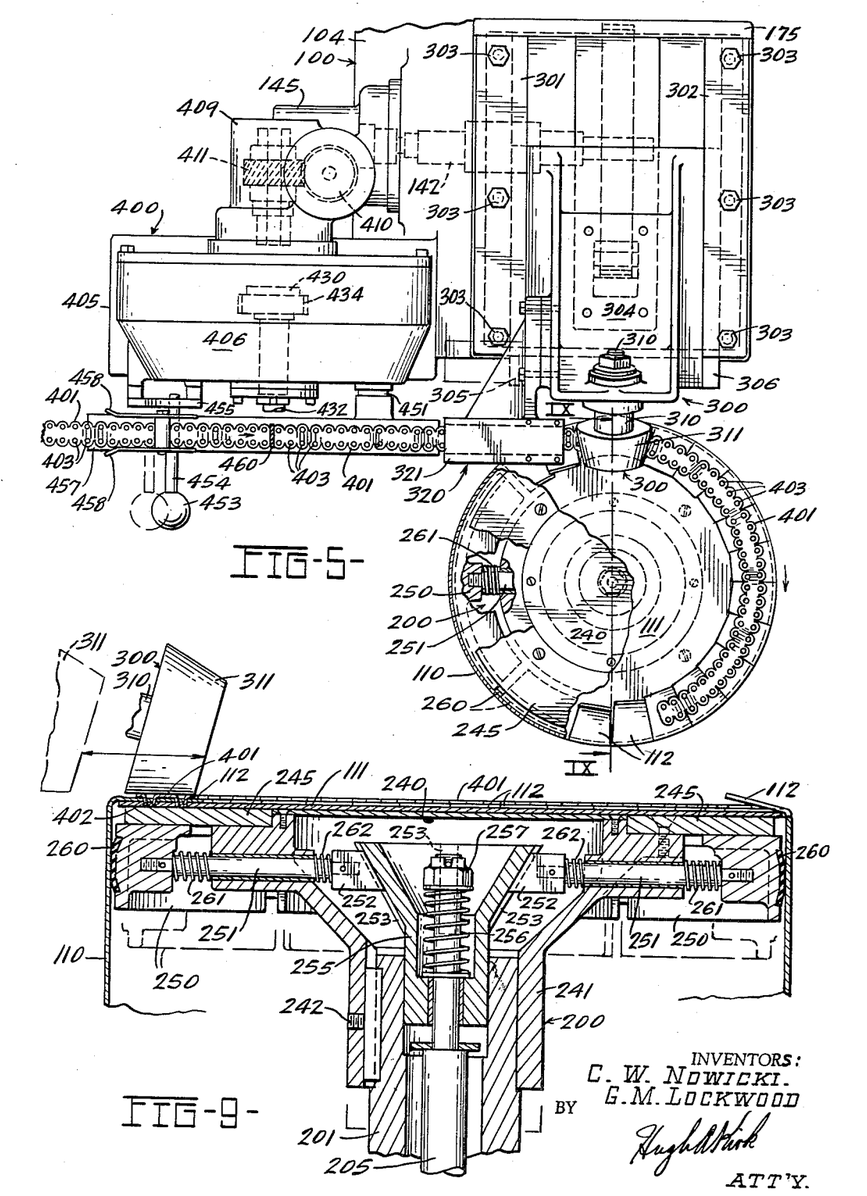
FIG. 5 is a slightly enlarged top plan view of the machine shown in FIG. 1 with part of the spindle plate broken away, and with a metal strip of the type disclosed in the above mentioned Hines patent being fastened onto the flanged end of the drum.
FIG. 9 is an enlarged sectional view through the upper end of the spindle or mandrel taken along line IX—IX of FIG. 5 and showing the expansion means associated therewith.

The other lever 174 journalled on the shaft 173 which projects opposite from the cam follower lever 172, extends upwardly through the housing 104 to operate the pressing roller 300 by moving it along the slanting upper surface 175 of the housing 104 parallel to the slanting surface 103, for extending and retracting the pressing roller assembly 300 from extending over the edge of the flange 112 on the container blank 110 as shown in FIGS. 1, 5 and 9 to its retracted dotted line position shown in FIGS. 4 and 9 away therefrom so that the blank 110 and completed drum may be placed on and removed from the mandrel 200 at the ends of the operation cycle of the machine. The outer end of the lever 174 is shown connected by a short link 176 to a projection mounted on the pressing roller assembly 300.

Thus the forms of the surface cams 160 and 170 shown, operate the raising and lowering of the mandrel 200 and extension and retraction of the pressing roller 300 in proper synchronism with each other and the rotation of the mandrel and drum thereon as shown in the time diagram cycle of operation of these parts in FIG. 13, which will be described in more detail in connection with section V later in this description.

(II) *The mandrel*

Referring now to the spindle or mandrel mechanism 200 there is shown in FIGS. 1 and 2 a hollow shaft or spindle 201 which has its lower end keyed at 202 for axial movement during rotation inside the outer hollow shaft 135. This shaft or spindle 201 of the mandrel 200 extends outwardly at right angles to the surface 103 so as to be at an angle for easy loading and unloading of the blanks 110 on to the mandrel 200 by an operator who stands in front of the machine, namely facing FIG. 2 or at right of FIG. 1. Centrally of this hollow shaft or spindle 201 there is mounted a stationary rod 205 which is fixedly anchored at its lower end, such as by threads 206 into a lower housing assembly 207. Thus the rod 205 remains stationary while the spindle or shaft 201 both rotate and move axially relatively thereto.

This axial movement of the shaft 201 is provided by the rocking of the lever 164 and its forked ends 165 which engage the rotating grooved ring 210 through the trunnions 211 (see FIGS. 7 and 8) mounted at the fork ends 165 of the lever 164. The connection of the grooved ring 210 is not directly with the spindle 201, but is through a second ring 215 which is fastened such as by set screw 216 to the spindle 201. These rings 210 and 215 are connected together by pins or bolts 217 fastened into the lower face of the fixed ring 215 and limited axially slidable in corresponding shouldered holes 218 in the lever arm engaging grooved ring 210. Intermediate of these holes 218 in ring 210 are provided other shouldered holes 219 in which are mounted compression springs 220 through which springs the upward movement of the spindle 201 is resiliently applied. Thus a substantially constant pressure is applied through the springs 220 against the pressing roller 300 when in its extended position, and damage of both the mandrel 200 and pressing roller is prevented.

Also mounted on the rotating spindle 201 is an axially adjustable frusto-conical lower drum support and guide 230 having an outwardly extending lower flanged edge 231 against which the open end of the cylindrical drum blank 110 rests as shown in FIGS. 1 and 2. Thus guide 230 may be axially adjusted by means of split ring 232 (see FIG. 7) and screw 233 according to different length drums or drum blanks to be formed on the machine. For example, for a short blank it may be placed in its dotted line position 230' as shown in FIG. 2, while long blanks it is set into the full line position shown. For each setting, however, the distance from the flange 231 to the top of the mandrel or plate 240 (see also FIG. 9) should be less than the length of the blank 110 so that the end flange 112 on the drum extends above the plate 240 to be bent thereover as shown in FIGS. 2 and 9 and pressed onto or adhered to the peripheral edge of the end disk 111. This flange 112 may be continuous and crimped by the pressing roller 300, or it may be slit into tabs or flaps as shown in FIG. 5 without departing from the scope of this invention.

The upper end plate 240 of the spindle may be mounted on a hub portion 241 keyed to the upper end of the rotating spindle 201, such as by a set screw 242 (see FIG. 9) and have bolted to its peripheral outer surface a relatively hard staple or metal prong clinching ring or plate 245. Below this top or end plate or surface 240 there are shown a series of circumferentially arranged shoes 250 mounted on the ends of radially journalled rods 251, at the inner ends of which rods are mounted angular cam followers 252. These followers 252 ride against the stationary conical surface 253 of the conical cam hub 255 attached to the upper end of the stationary central rod 205 through the action of a compression spring 256 or other resilient means by the nut 257 keyed to the upper end of the rod 202. Around the outer surface of the radially extending shoes there may be provided a stretched elastic band 260 which normally urges the shoes inwardly to maintain the cam followers 252 against the surface 253 of the stationary conical cam hub 255. This band 260 also serves as a friction engaging means with the inside of the drum carton 110 near the disk end of the drum for insuring that the drum 110 rotates with the mandrel 200 when the shoes 250 are expanded by the axial raising of the spindle 201 relative to the cam hub 255 as shown in full lines in FIG. 9. The retracted position for the shoes 250 is shown in dotted lines in the same figure therebelow. Thus the raising of the spindle 201 to cause the end of the drum to come into pressing contact with the pressing roller 300, also expands the shoes 250 and band 260 beneath the end plate 240 against the compression of spring 256 to frictionally engage the inside of the drum 110 and insure its continued rotation with the spindle 201 by substantially continuous contact with the inside of the drum just below the end thereof. The spring 256 is of such a strength to prevent the rupture of the drum sides 110 and may be adjusted by the nut 257. Also if desired, springs 261 and/or 262 may be inserted at the ends of the rods 251 to counteract or aid the inward pressure of the circumferential band 260.

After the forming of the end 111 on the drum 110 is completed, the retraction or lowering of the spindle 201 releases the shoes 250 and band 260 from the inside of the drum 110, so that the completed drum with its end 111 may be readily removed from the mandrel 200.

(III) *The pressing roller*

The pressing roller mechanism 300 is herein mounted on a slide track which may comprise rails 301 and 302 which may be anchored such as by bolts 303 to the top inclined surface 175 of the upper body portion 104, which track is parallel to the top plate 240 of the mandrel 200. As shown in FIG. 5 the sliding part 304 of the mechanism 300 has flanged edges 305 and 306 which cooperate with the overhanging rails 301, 302, and this assembly 304 also is provided with a depending lug 307 shown in FIG. 4 to which the link 176 is pivotally connected from the upper end of the lever 174. This lug 307 which extends below the center of the sliding assembly 304 extends through an aperture in the upper end of the body 104 between the rails 301 and 302, and preferably is covered by the assembly 304.

A stub shaft 310 is journalled at the front end of this assembly 300 to mount a conical roller 311 which is positioned and tapered at such an angle that when in its extended position shown in FIG. 9, its conical surface completely and rollingly contacts without slipping the annular peripheral edge of the end of the drum to bend over the flange 112 as well as press it and any fastening strip against the end disk 111 and ring plate 245 to fasten the flange 112 and disk 111 together to form the drum. If a metal strip 401 with prongs 402 as shown in Hines Patent No. 2,996,237 is fed from the strip feeding mechanism 400, these prongs 402 are embedded in the flange 112 and end disk 111 and may also be clinched against the clinch ring or plate 245 at the top of the mandrel 200. The friction between the drum against the under side of the pressing roller 311 causes this roller to rotate on its shaft 310. If desired, the roller 311 may be driven by a separate motor (not shown) mounted on the slide assembly 304 without departing from the scope of this invention.

Also mounted on the side of the slide assembly 304 there is shown in FIG. 5 a strip guide member 320 which retracts and extends with the slide assembly 304 and acts as a guide for the strip 401 directly toward the pressing roller 311, so as to insure its proper alignment and engagement around the peripheral end of the drum. This guide 320 when in its extended position with the roller 311, aligns with the feeding mechanism 400 from which the strip 401 is fed as shown in FIG. 5. Also there may be mounted a resilient spring strip 321 on the top of the guide member 320 as shown in FIGS. 2, 3 and 5, to prevent the strip 401 from buckling up over the top of the guide 320 as it is pushed from the feeding mechanism 400 into the guide 320.

(IV) *The strip feeder*

Figures 10, 11, 12:
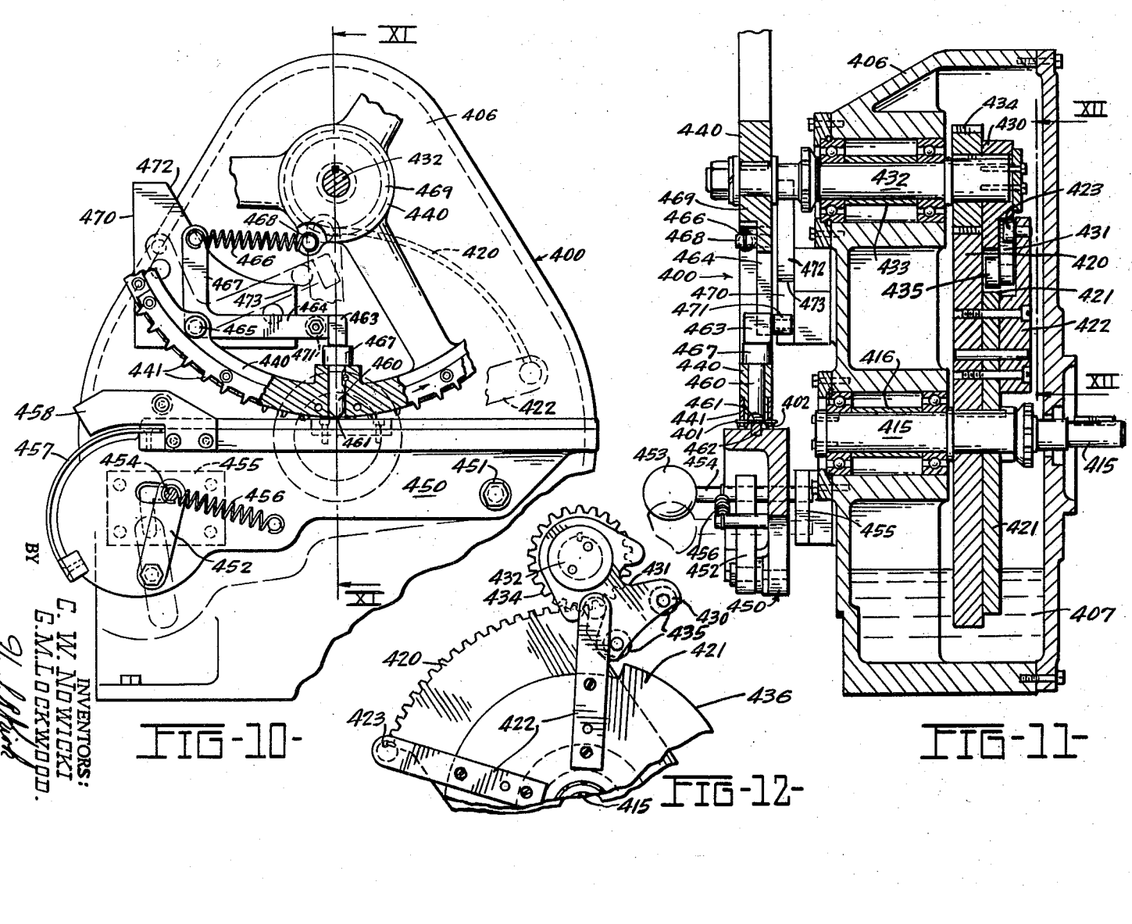
FIG. 10 is an enlarged side elevation of a part of the feed wheel and cut-off device for the metal strip also shown in FIG. 2, together with the pivoted strip feeding guide, the open position of which is shown in dotted lines.
FIG. 11 is a sectional view taken along line XI—XI of FIG. 10 showing the gears for driving the feed wheel and strip cut-off device.
FIG. 12 is a sectional view taken along line XII—XII of FIG. 11 showing the Geneva movement for operating the strip feeding wheel.

During the cycle of forming the end on the drum 110 there may be fed thereto an adhering or fastening strip 401 from a feeding mechanism 400, which may be mounted to the upper side of the upper body portion 104 of the machine, such as on a bracket 405 which feeder mechanism 400 may comprise a housing 406 in which the gearing for driving the feeder may be housed, and in the bottom of which may be a reservoir for a lubricant 407 (see FIG. 11) into which at least one of the gears dips.

On the rear side of this housing 406 there is shown in FIGS. 1, 3 and 5 a gear box 409, similar to the gear box 147, in which there may be mounted on shafts at right angles to each other a pair of worm gears 410 and 411 (see FIG. 5), the latter gear 411 of which is keyed to shaft 415 journalled on bearing 416 (see FIG. 11) mounted in the housing 406. Rotated by this shaft 415 is a 90° sector gear 420 (see FIG. 12) which is bolted to a cam disk 421 of a Geneva type movement and has at the ends of the sector gear 420 the cam follower operating levers 422 with projecting pins 423 at their outer ends (see FIGS. 11 and 12) for engagement with the cooperating Geneva type cam follower 430 with notches 431 for pins 423, mounted on shaft 432 in bearing 433 in the upper part of the casing 406. This shaft 432 also mounts and is keyed to a pinion gear 434 which engages with and is turned by the 90° sector gear 420 for rotation of the strip feeding wheel 440 which is mounted on the front or outside of the housing 406. Thus one complete rotation of the cam disk 421 and sector gear 420 will also cause one complete rotation of pinion gear 434 but only during one quarter of the rotation of the disk 421 and its shaft 410. The Geneva movement cam 421 and its cam follower 430 prevent the rotation of the shaft 432 and its gear 434 during the other three quarters of the revolution of the shaft 410, which is insured by the engagement of the rollers 435 or cam follower 430 which frictionlessly engage the arcuate surface 436 of the cam 421 (see FIG. 12), thereby reducing wear between the parts of the Geneva movement.

The feeding wheel 440 herein is provided with teeth or projections which mesh with apertures 403 in the strip 401 shown in FIG. 5 and in the above mentioned Hines patent. These apertures 403 in the metal strip 401 also have the prongs 402 depending from their edges. This engagement positively pushes or feeds the strip 401 over or along the guiding shoe 450 and into the extended guide 320 on the pressing roller assembly 304. This guiding shoe 450 is pivoted at 451 to the housing 406 and may be lowered into its dotted line position shown in FIG. 10 by the operation of the spring pressed lever 452 controlled by manual knob 453 (see FIG. 11). This lever releases pin 454 from a catch 455 mounted on the housing 406 against the action of the spring 456. Thus by unlatching the shoe 450, the apertured strip 401 may be fed accurately and easily underneath and engaged with the feeding wheel 440. The outer end of the guide shoe 450 may be provided with an arcuate guiding surface 457 and side guides 458 to insure proper feeding and alignment of the strip 401 with the wheel 440. This strip 401 may be supplied from a package or reel 459 thereof which may be placed in a magazine adjacent the machine as shown in FIG. 2.

The feeding wheel 440 is of such a diameter that its periphery is equal to the length of the strip that just reaches once around the edge of the drum, as partly shown in FIG. 5. This length of strip is cut off at the end of one complete rotation of the wheel 440 by means of a cutter 460 mounted to move radially outwardly from radius of the wheel 440. The actuation of this cutter 460 forces its lower knife edge 461 shown in FIGS. 10 and 11 against an anvil or a hard plate 462 mounted on the shoe 450 below it, to cut off the strip 401 to a length corresponding to that of the circumference of the drum and being formed. This cutter 460 is operated by a hammer 463 mounted at the end of a bell crank lever 464 pivoted at 465 to the rim of the wheel 440. This hammer 463 is biased into engagement with the head 467 of the cutter 460 by means of a spring 466 connected between the other end of the bell crank lever 464 and pin 468 adjacent the hub 469 of the wheel 440. Mounted on the outside of the housing 406 is a stationary cam plate 470 along which a follower 471, mounted at the hammer end of the bell crank lever 464, rides just before the wheel 440 completes one full revolution into the full line position shown in FIG. 10. During this time the hammer end 463 of the bell crank lever is raised into its dotted line position against the action of the spring 466 as the follower 471 rides over the cam surface 472, and then when it rides off the edge 473 of the cam 470, the hammer under the action of the spring 466 strikes a hard blow against the head 467 of the cutter 460 to sever the strip 401 each rotation of the feeding wheel 440.

(V) *Operation cycle*

Figure 13:
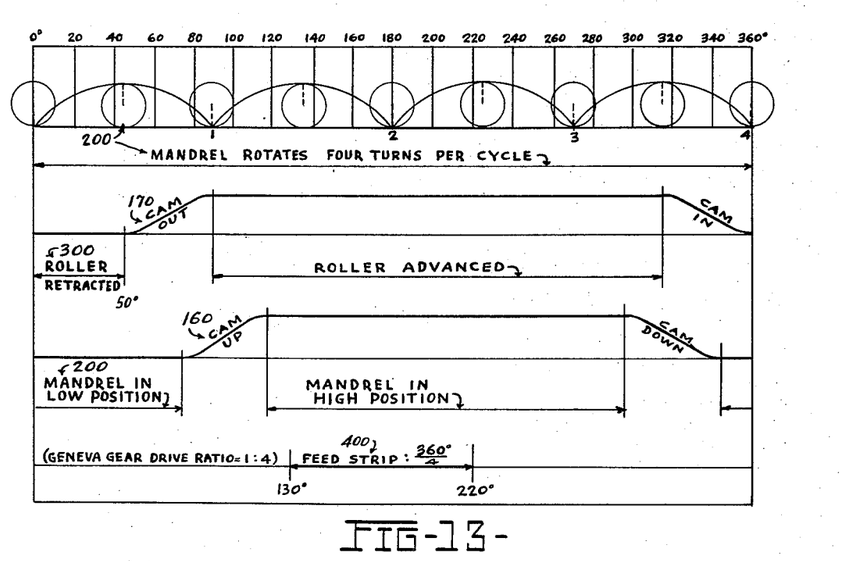
FIG. 13 is a time diagram showing the relative times and duration of operation of the cams for retracting and advancing the pressing roller; lowering and raising the spindle or mandrel, and drive of the strip feeding wheel, during four rotations of the spindle comprising one cycle of the operation of the machine shown in the above figures.
Figure 14:
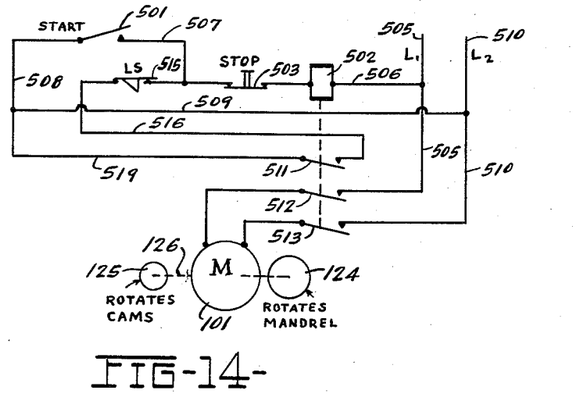
FIG. 14 is a schematic wiring diagram of the electrical control circuit for starting and stopping the operation of one cycle of the machine of this invention.

In describing the automatic cycle operation of the machine of this invention, reference will be had to FIGS. 13 and 14, the latter of which discloses a wiring diagram for the energization of the motor for driving the apparatus through one complete cycle.

Assuming that the motor is de-energized, the mandrel 200 and pressing roller 300 are retracted, and the strip feeding mechanism 400 is stationary with the incoming strip 401 adjacent the cutter 460 and in engagement with the teeth 441 of the wheel 440, the machine is ready for placement of a cylindrical blank 110 and disk 111 over the mandrel 200 by an operator. It is also assumed the blank support 230 of the mandrel is adjusted to the proper distance from the top plates 240 so as to permit the flange 112 of the blank 110 to be bent over on top of the end disk 211 which is then placed on the plate 240 inside the flanged end 112.

With the cylindrical drum blank 110 and disk 111 in position, the START push button 501 (see FIGS. 2 and 14) is pressed which energizes relay 502 by a circuit from one power conductor 505, through conductor 506, relay 502, normally closed STOP switch 503, conductor 507 now closed START switch 501, conductors 508 and 509 to other power conductor 510. The energization of the relay 502 closes its holding contacts 511, and its motor energization contacts 512 and 513, the closure of which applies power from the power conductors 505 and 510 directly to the motor 101 to start it rotating. This motor relay 502 remains operated through the holding circuit for the relay 502 from power conductor 505, relay 502, switch 503, normally closed cam operated limit switch 515 (see also FIGS. 1, 3 and 4), conductor 516, contacts 511, and conductors 519 and 509 to power conductor 510. Thus the motor 101 will now remain energized until the manual STOP switch 503 or limit switch 515 is opened. The limit switch 515 is opened on the retraction of the pressing roller 300 by the cam lever 174 at the ends of its travel to its retracted position. The opening of this limit switch 515 breaks this circuit long enough to de-energize the relay 502 and open its holding contacts 511, so as to prevent a re-start of the motor 101 until the START button 501 is pressed again to start the next cycle of operation.

With the motor 101 in operation, the mandrel 200 first starts rotating and after it rotates about 200°, or 50° of the complete operation cycle as shown in the chart of FIG. 13, the pressing roller cam 170 starts to extend the pressing roller 311. When the roller 311 is just about to its extended position, the cam 160 for the mandrel 200 raises the mandrel to press the flanged edge 112 of the blank 110 against the extended roller 311, shortly after which at about 130° through the operation cycle, the synchronized strip feeding mechanism through its Geneva type gearing starts feeding the strip 401 over the guide shoe 450 and through the guide 320 onto the drum end under the roller 311. After the strip 401 is on the drum end, the drum rotates preferably one further complete revolution before the mandrel 200 starts to drop at about 298° of the operation cycle and shortly after that the pressing roller cam 170 retracts the pressing roller 311 so that by the time the mandrel 200 is completely retracted and the pressing roller is also completely retracted, the lever 174 operates the limit switch 515 to stop the motor 101 and one operation cycle has been completed automatically.

The apparatus is now in the position as it was before the drum blank 110 and disk 111 were placed on the mandrel 200 and the completed drum with end thereon may now be removed from the mandrel 200, and a new blank 110 and disk 111 may be placed thereon for repeating the operation as just described.

Although belts 122 and 123 are shown for the pulleys from the gear box 120 for driving the spindle 201 and cams 160 and 170, these belts may be replaced by gears or sprocket chains without departing from the scope of this invention. Also, if desired, the mandrel 200 and spindle 201 may be placed at another angle than that shown, including vertical and horizontal. As previously stated, the pressing roller 311 may be positively driven by a separate motor mounted on its slide 304, and also may not need to be extended and retracted, provided sufficient room for inserting and removing the drum blanks 110 and completed drums is provided, such as by further lowering the mandrel or increasing its axial travel.

Although the above identified invention discloses a machine with one spindle or mandrel 200, there may be mounted on one unit or body 100 a plurality of such mandrels 200, so that when one is being unloaded and loaded by an operator, the other mandrel or mandrels are in operation. Furthermore, the machine of this invention may include an adhesive applicator (not shown) for either the strip 201 and/or the drum flange 112 and/or the disk 111 without departing from the scope of this invention.

While there is described above the principles of this invention in connection with specific apparatus, it is to be clearly understood that this description is made only by way of example and not as a limitation to the scope of this invention.

What is claimed is:

1. A machine for applying a pronged strip near the periphery of an end of a flexible tubular container comprising:
   (a) means for supporting said container and said end in fastening position,
   (b) roller means for overlapping adjacent edges of said end and said container against said supporting means,
   (c) means for relatively moving said roller means and said supporting means axially of said supporting means for clamping said overlapping edges between said supporting means and said roller means for fastening said edges together,
   (d) means for feeding a pronged strip into said clamping means, and
   (e) means for rotating said container and its end for moving said edges relative to said clamping means whereby said roller means presses said prongs on said strip through said overlapping edges around said end of said container.

2. A machine according to claim 1 wherein said roller means for overlapping the edges of said end and said container includes means for reciprocating said roller means to and from said overlapping edges.

3. A machine according to claim 1 wherein said means for clamping said edges includes cam operating means for axially moving said supporting means.

4. An automatic machine according to claim 1 including means for stopping said moving means and unclamping said edges after said edges have been fastened together.

5. A machine for fastening an end on a flexible tubular container comprising:
   (a) mandrel means for supporting said container and said end in fastening position,
   (b) a retractable pressing roller means for overlapping adjacent edges of said end and said container against said supporting means,
   (c) means to move said roller means over the end of said container,
   (d) means for feeding a pronged fastening strip along said overlapping edges,
   (e) means for axially moving said mandrel with said container for clamping said overlapping edges and said strip between said supporting means and said overlapping means for pressing the prongs on said strip into said overlapping edges for fastening said edges and said end together,
   (f) means for rotating said mandrel with said container and its said end for moving said edges and said strip relative to said roller means as said strip is fed along said overlapped edges, and
   (g) means associated with said feeding means for cutting off said strip to a length corresponding substantially to the length of said overlapped edges.

6. A mechine according to claim 5 including a common driving means for synchronizing the operations of said roller means, said feeding means and said clamping means with mandrel rotating means.

7. A machine according to claim 5 wherein said supporting means for said container includes resilient means operated by said mandrel moving means for frictionally engaging said container to insure its rotation with said mandrel.

8. A machine according to claim 5 including a resilient connection between said mandrel means and said means for axially moving said mandrel.

9. An automatic machine according to claim 5 including means for retracting said mandrel means and said pressing roller means, and stopping the rotation of said mandrel after said strip has been securely pressed along the full length of said edges.

10. An automatic machine for fastening an end on a flexible tubular container comprising:
    (a) means for supporting said container and said end in their fastening positions,
    (b) roller means for overlapping adjacent edges of said end and said container against said supporting means,
    (c) means for feeding a pronged strip along said overlapping edges,
    (d) means for elevating said supporting means for clamping said overlapping edges and said strip between said supporting means and said overlapping means for embedding said prongs on said strip into said overlapping edges for fastening said edges together,
    (e) means for cutting off said strip at length corresponding substantially to the length of said overlapped edges,
    (f) means for rotating said container and its end for moving said edges and said strip relative to said clamping means as said strip is fed along said overlapped edges, and
    (g) for stopping said moving means and for unclamping said edges after said strip has been embedded along the full length of said edges.

11. A machine according to claim 10 wherein said means for feeding said strip includes means for synchronizing said feeding means with the rotation of said container.

12. A machine according to claim 11 wherein said synchronizing means rotates said container a predetermined number of times for one machine operation cycle and only operates said feeding means during one of said rotations.

13. A machine according to claim 12 wherein said synchronizing means comprises a Geneva type cam and roller cam follower therefor.

14. A machine according to claim 10 wherein said means for cutting off said strip is operated by said strip feeding means.

15. A machine for fastening bottom disks on the ends of drum cartons comprising:
    (a) a source of thin metal strip having rows of alternate notches and burred holes along each edge thereof,
    (b) means to measure and feed a predetermined length of said metal strip to the end of a drum carton having a disk positioned therein, (c) roller means to flange the peripheral edge of the drum end inwardly into engagement with said disk,
(d) means to guide said strip onto the flanged edge of said drum under said roller means, and
(e) means under said drum end to urge said drum end and said strip against and past said roller means to embed the burrs on said strip into and around the end of said drum adjacent the edge thereof.

16. A machine for fastening bottom disks on the ends of drum cartons by means of a thin metal strip having a row of burred holes along each notched edge, comprising:
(a) a supply of notched and burred strip,
(b) means to feed a measured length of said strip to the end of a drum carton having a disk placed thereon,
(c) means to rotate said drum and disk,
(d) means to roll the peripheral edge of the drum end inwardly over the disk,
(e) means to guide said strip tangentially to the drum and over the inturned edge of said drum, and
(f) means to urge said drum edge and said strip against said roller means so that the burrs on said strip penetrate the inturned edge of said drum and said disk to secure said disk in place as said drum and disk are rotated by said rotating means.

17. A machine according to claim 15 in which said means to rotate said drum and disk includes a mandrel fixed to a rotary spindle and motor means to drive said spindle.

References Cited by the Examiner
UNITED STATES PATENTS

| | | | |
|---|---|---|---|
| 598,307 | 2/98 | Leffler | 1—117 |
| 637,938 | 11/99 | Leffler | 1—117 X |
| 2,320,684 | 6/43 | Van Suan | 1—107 |
| 2,350,278 | 11/44 | Hines | 1—132 |
| 2,651,977 | 9/53 | Wilcox et al. | 93—39.1 X |

References Cited by the Applicant
UNITED STATES PATENTS

| | | |
|---|---|---|
| 3,133,482 | 5/64 | Armstrong et al. |

GRANVILLE Y. CUSTER, JR., *Primary Examiner.*